May 10, 1927.
W. SHELDON
WELL DRILLING CHUCK
Filed Sept. 6, 1924
1,628,283
2 Sheets-Sheet 1
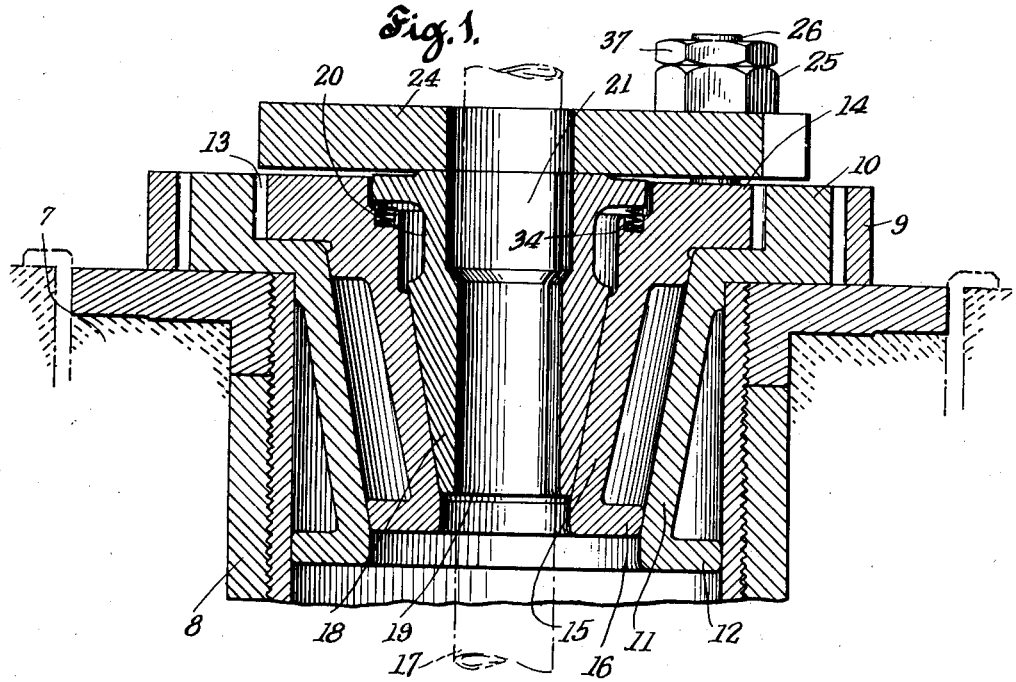
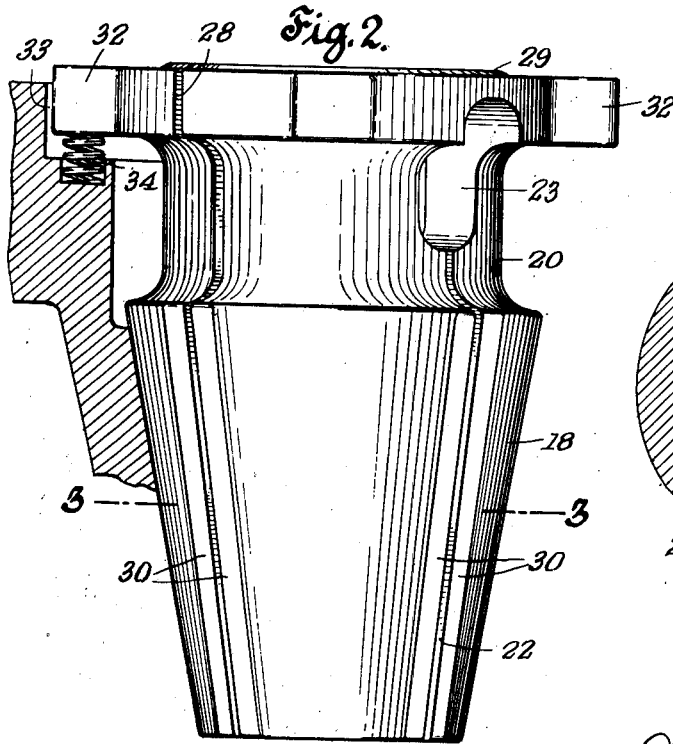
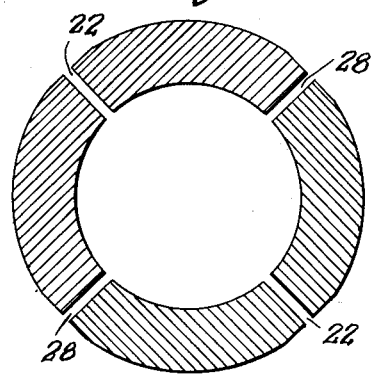
INVENTOR
Waldo Sheldon
BY
Philip S. McTea ATTORNEY May 10, 1927.
W. SHELDON
1,628,283
WELL DRILLING CHUCK
Filed Sept. 6, 1924  2 Sheets-Sheet 2
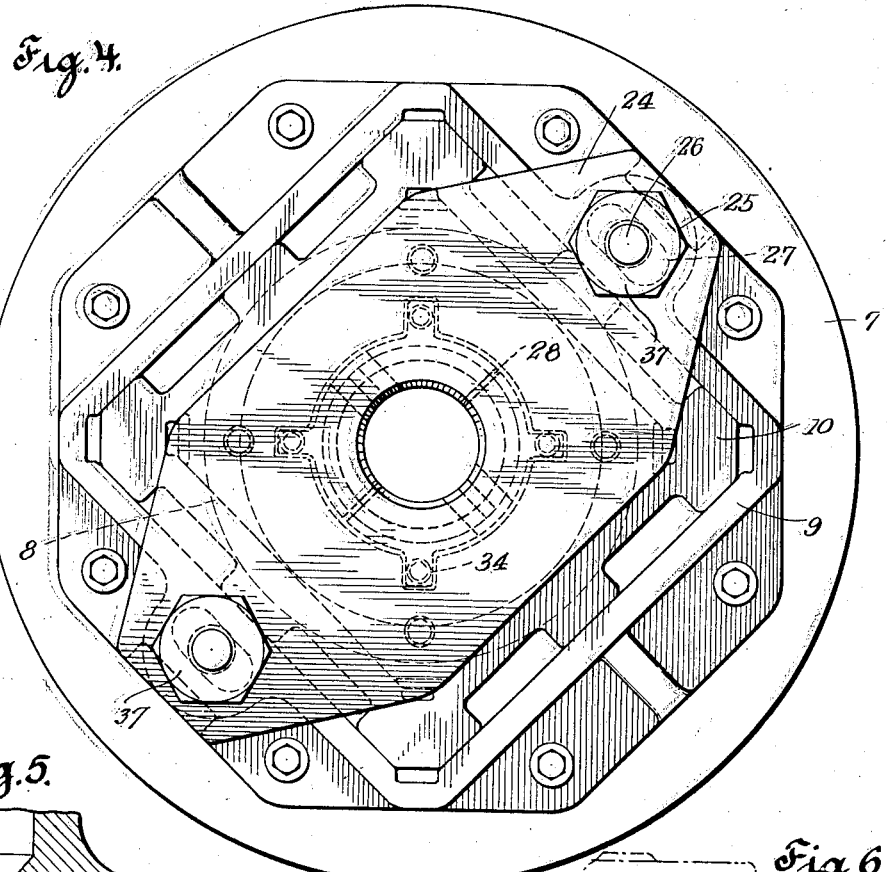
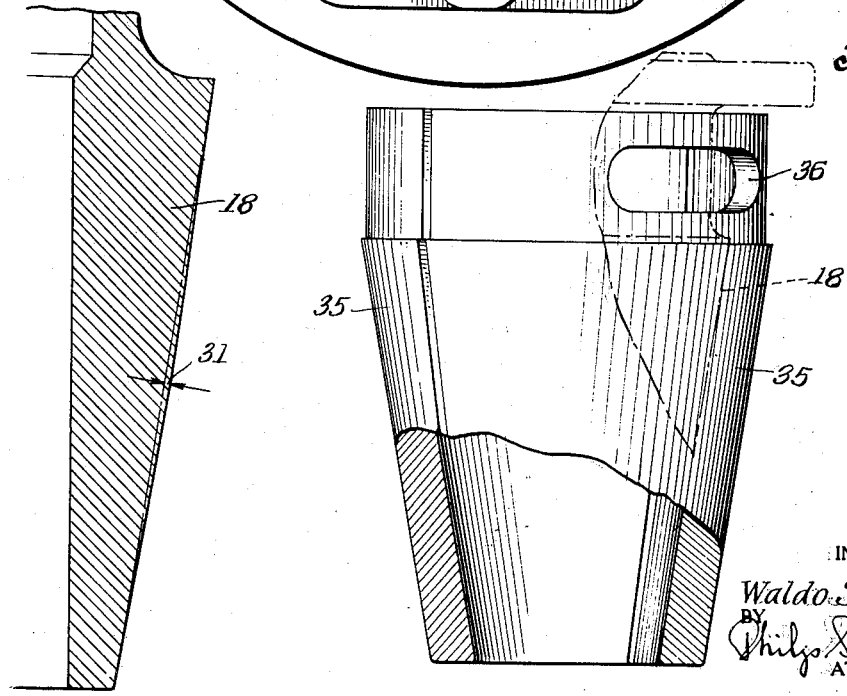
INVENTOR
Waldo Sheldon
BY
ATTORNEY Patented May 10, 1927.

1,628,283

UNITED STATES PATENT OFFICE.

WALDO SHELDON, OF GREENWICH, CONNECTICUT.

WELL-DRILLING CHUCK.

Application filed September 6, 1924. Serial No. 736,206.

This invention relates to the drilling of deep oil wells and the like.

For such operations and particularly where pressure feed is employed as in the apparatus of my prior applications, it is essential that the drill stem be firmly held and it is also desirable that this be effected without cutting into or crushing the stem or drill pipe.

The objects of the present invention are to provide a chuck for well drilling which will hold the hollow drill stem so securely that any desired degree of drilling force may be applied and without cutting or destroying the same; which can be quickly adjusted with respect to the drill stem and which will be of simple, sturdy and compact construction.

These and other objects are attained in the structure illustrated in the accompanying drawings which disclose, however, only certain of the many possible embodiments of the invention.

Figure 1 is a vertical sectional view of a portion of the chuck head which is keyed to the rotary support as employed in pressure feed drilling apparatus disclosed in my co-pending applications and showing a chuck construction of the present invention as applied thereto.

Figure 2 is an enlarged view of the spring collet which grips the drill pipe.

Figure 3 is a cross sectional view of the collet as on substantially the plane of line 3—3 of Figure 2.

Figure 4 is a plan view of the parts appearing in Figure 1.

Figure 5 is an enlarged fragmentary sectional view of the tapered wall of the collet.

Figure 6 is a broken sectional view of an adapter or reducing bushing which is employed for seating collets of smaller size.

In Figures 1 and 2, a portion of the rotary support is shown at 7 to which the vertically movable power actuated chuck sleeve 8 is keyed, having a bore therethrough of sufficient size to pass the drill stem and casing sections.

Secured on top of the support, a substantially rectangular frame 9 is shown which provides an angular seat about the upper end of the bore to receive the correspondingly angular head portion 10 of a drive bushing having a tapered socket portion 11 extending down into the bore of the support and braced and reinforced at its lower end by an annular outstanding rim 12 of substantially the same diameter as the bore of the support.

The drive bushing is enlarged at its upper end into an angular seat 13 to receive the correspondingly angular head 14 of an adapted bushing which has a tapered socket 15 braced at its lower end from the tapered socket of the drive bushing by an outstanding annular flange 16. This tapered socket is shown as of true conical form, tapered on straight lines from the upper to the lower end of the same.

The drill stem or pipe which is indicated at 17 is gripped by a chuck or grip, shown as a spring collet which seats in the conical socket in the adapter bushing and is adjustably compressed upon the stem by an overstanding clamp. As best shown in Figure 2 this collet has an externally tapered lower portion 18 substantially fitting into the adapter socket and a substantially cylindrical inner surface 19 to make practically continuous engagement about the pipe. Above the tapered portion the collet is shown as of reduced external diameter at 20 and of increased internal diameter at 21. The slots of cuts 22 which give the collet its springy character, extend from the lower smaller end up through the reduced or thinned neck portion into enlarged bores or cuts 23 near the upper end or head of the collet structure, which construction gives maximum yielding characteristics in a structure like this, which must necessarily be fairly heavy and strong, to transmit the requisite force and carry the great weight of the drill stem.

The gripping effect of the collet is governed by the extent to which it is thrust down in its socket. The clamp or adjusting means for this purpose is shown as a bar 24 extending across the top of the collet and acted on at its opposite ends by the nuts 25 on the stud bolts 26 which are set into the frame 9. This clamp bar, for convenience in handling, may be made in two longitudinally separate sections as shown, slotted at their opposite ends as indicated at 27 to facilitate their engagement over and disengagement from the bolts 26.

To facilitate application, adjustment and removal of the collet, the same is preferably constructed in two or more longitudinally separate complemental sections shown here as separated on a diametrical plane 28. This enables the collet to be slipped into place at the sides of the stem in sections, which sections can be of a size to be easily handled.

An edge bearing, as distinguished from a surface bearing is preferably provided between the clamp bar and collet as by providing the collet with an annular bearing ridge 29 on the upper end of the same. This permits of a certain compensating or self-adjusting action of the collet sections as they are thrust down into the socket and into yielding engagement with the pipe.

It has been found that the spring gripping action is improved by "flatting" the surfaces adjoining the edges of the two sections and adjoining the splits in the sections, substantially as indicated at 30, and by swelling the intermediate diameter of the tapered portions beyond the straight conical outline, as indicated at 31 in Figure 5. These features of construction materially ease the action of the collet in its socket and reduce the friction of the collet in its socket. The swelling or intermediate enlargement of the collet jaws also apparently has the effect of enabling such jaws to adjust themselves so as to grip the pipe evenly throughout the entire areas of contact.

The rotary driving of the collet is effected in the illustration by keying the collet sections in the adapter bushing by means of radially projecting lugs 32 on the upper ends of the collet sections engaging in seats 33 provided at the edges of the adapted socket.

The grip of the collet on the drill pipe can be released by simply loosening the clamp. To assist this releasing effect, springs 34 are shown positioned in the seats 33 beneath the drive lugs and exerting pressure on said lugs to lift the collet sections as the pressure of the clamp is removed. Thus with this construction the collet sections will be automatically retracted from gripping engagement with the drill pipe as soon as the sections are freed of the clamping force. This automatic freeing action also enables the collet sections to be quickly lifted out of the socket when it is necessary to change collets or the like, and such removal is also facilitated by the openings 23 at the upper ends of the spring slots which are shown as extended up near enough the upper end of the collet to afford grips which become available by the spring lifting of the collet sections. These springs by supporting the collet sections in separated relation, enable the drill pipe to be readily entered therebetween.

When smaller size drill pipe is to be handled, a correspondingly smaller size spring collet may be used and to enable the interchange of one size for another, special reducing bushings may be employed as illustrated in Figure 6, consisting of segmental conical sections 35 adapted to be dropped into the collet socket 15 and to thereby form a tapered socket of reduced size to receive the smaller size collet, such smaller size collets being, however, of the same size as the larger collets at their upper ends and provided with the same size drive lugs so that they may be interchanged without affecting the drive connections. These reducing sections therefore extend to less than the full height of the collets as indicated in Figure 6, so as not to interfere with the drive connection and they are shown as having hand-holes 36 in their upper ends for convenience in inserting and removing them.

To prevent the clamp nuts from working loose, these may be backed up by suitable lock nuts such as indicated at 37.

While a preferred embodiment of the invention has been illustrated and described herein, it should be understood that the structure may be modified in various respects without departure from the broad spirit and scope of the invention as hereinafter claimed.

What is claimed is:

1. In well drilling apparatus, a horizontally mounted rotary table having a downwardly faced conical socket, a spring collet seated in said socket and adjustable means engaged over the top of said spring collet for forcing said spring collet downwardly in said socket into compressive engagement with the drill stem.

2. In well drilling apparatus, a drill stem chuck comprising a spring collet in separable parts each consisting of integrally and compressibly related gripping portions engageable about the sides of the drill stem and adjustable means for variably compressing said gripping portions of the several parts of the spring collet upon the drill stem.

3. In well drilling apparatus, a rotary table, a conical drive socket partaking of the rotary movement of said table, a sectional drill pipe driving grip seated in said socket, a sectional clamp overstanding the sections of said grip and adjustable means acting on said sectional clamp to force the sections of the grip to a variable extent down into the conical socket.

4. In well drilling apparatus, a rotary table having a downwardly facing conical socket with seats at the side of the same, a drill stem engaging spring collet mounted in said socket and having drive lugs engaging in the seats irrespective of spring adjustments of the collet and means engaged over the top of the collet and adjustable for forcing the same to a variable extent down into the socket.

5. In well drilling apparatus, a sectional spring collet, the sections of said collet each having a drive lug, a compressing socket for said collet provided with seats to receive the drive lugs of the several spring collet sections and a clamp overstanding said collet for forcing the same adjustably down into said compressing socket, the seats being deep enough to take the drive lugs of the collet to the full extent of such adjustment.

6. In well drilling apparatus, drill stem holding means comprising a conical socket, a conical spring collet seated in said socket and an overstanding adjustable clamp for forcing the spring collet to a variable extent into the socket.

7. In well drilling apparatus, drill stem holding means comprising a conical socket, a conical spring collet seated in said socket, an overstanding adjustable clamp for forcing the spring collet to a variable extent into the socket and means for mounting the socket, collet and clamp as a unit on the rotary support.

8. In well drilling apparatus, a conical socket, a drill stem engaging spring collet seated in said socket, a two-part clamp bar engaged over said spring collet and adjustable securing means at the ends of said clamp bar.

9. In well drilling apparatus, a collet compressing socket provided with seats at the sides thereof, a sectional collet engaged in said socket and having drive lugs positioned in the seats, clamp means for forcing the sections of the collet down into the socket and collet lifting springs housed and protected in the seats beneath said drive lugs.

10. In well drilling apparatus, a collet compressing socket having seats at the sides of the same, a spring collet mounted in said socket and consisting of separate spring collet sections having drive lugs entering the seats, means for adjusting the collet sections in the socket and collet retracting springs disposed in the seats beneath the drive lugs.

11. In well drilling apparatus, a drill stem engaging spring collet having a bearing ridge at one end of the same and collet adjusting means engaged with said bearing ridge.

12. In well drilling apparatus, a tapered spring collet having an annular bearing ridge at the larger or base end of the same and collect adjusting means engaged with said bearing ridge.

13. In well drilling apparatus, a drill stem engaging spring collet in complemental longitudinally separated sections provided with complemental sections of a bearing ridge at one end and collet adjusting means engaged with said bearing ridge.

14. In well drilling apparatus, a drill stem engaging spring collet in complemental longitudinally separated sections provided with complemental sections of a bearing ridge at one end and collet adjusting means engaged with said bearing ridge and including a clamp bar resting on said ridge and screw devices engaged with said bar.

15. In well drilling apparatus, a split spring collet for engagement with a drill stem having flattened portions adjoining the split therein and a socket receiving said spring collet.

16. In well drilling apparatus, a split spring collet in separable sections having flattened portions adjoining the split and the line of severance of the sections and a socket receiving said collet sections.

17. In well drilling apparatus, a conical spring collet split from the smaller end toward the base end of the same and having flattened portions adjoining the split and a socket receiving said spring collet.

18. As an article of manufacture, a tapered spring collet, said collet being split from the smaller end toward the larger end of the same and having flattened portions adjoining the split therein.

19. In well drilling apparatus, a conical socket and a tapered drill stem engaging collet seated in said socket and having a portion of swelled diameter intermediate the ends of the same.

20. In well drilling apparatus, a continuously tapered conical socket and a drill stem engaging tapered collet seated in said socket and having a portion intermediate the ends of the same of greater diameter than a straight taper from end to end of the collet.

21. In well drilling apparatus, a straight tapered conical socket and a drill stem engaging split spring collet seated in said socket, having a portion intermediate the ends of the same of greater diameter than a straight taper from end to end of the collet and a bearing ridge on the larger end of the same.

22. In well drilling apparatus, a straight tapered conical socket and a drill stem engaging split spring collet seated in said socket and having a portion intermediate the ends of the same of greater diameter than a straight taper from end to end of the collet and flattened portions adjoining the split therein.

23. As an article of manufacture, a drill stem engaging tapered spring collet in separable sections split from the smaller end toward the larger end of the same and having enlargements at the ends of the splits therein.

24. As an article of manufacture, a drill stem engaging tapered spring collet in separable sections split from the smaller end toward the larger end of the same and having enlargements at the ends of the splits therein and flattened portions at the sides of such splits.

25. As an article of manufacture, a tapered split spring drill stem engaging collet having flattened portions adjoining the split therein.

26. As an article of manufacture, a tapered split spring drill stem engaging collet having flattened portions adjoining the split therein and swelled portions intermediate the ends of the same.

27. As an article of manufacture, a split spring drill stem engaging collet of longitudinally tapered form having a portion intermediate the ends of the same at greater diameter than a straight taper from end to end of the collet.

28. As an article of manufacture, a drill stem engaging split spring collet in complemental sections of tapered form and having complemental portions of a bearing ridge at the larger end of the same.

29. As an article of manufacture, a drill stem engaging split spring collet in complemental sections of tapered form and having complemental portions of a bearing ridge at the larger end of the same and drive lugs outstanding from said larger base portion.

30. As an article of manufacture, a split spring drill stem engaging collet having a tapered section, a reduced section at the end of said tapered section, a head enlargement at the end of said reduced section provided with outstanding drive lugs by which the collet can be rotated irrespective of its spring adjustment, said collet being split from the smaller end of the tapered section through to said reduced portion.

31. As an article of manufacture, a split spring drill stem engaging collet having a tapered section, a reduced section at the end of said tapered section and split from the smaller end of the tapered section through to said reduced portion and having openings in the reduced portion into which the splits extend.

32. As an article of manufacture, a longitudinally tapered drill stem engaging collet split longitudinally from the smaller end toward the larger end of the same and provided with drive lugs at said larger base end.

33. As an article of manufacture, a longitudinally tapered drill stem engaging collet split longitudinally from the smaller end toward the larger end of the same and provided with drive lugs at said larger base end, said collet comprising separable complemental sections, each provided with at least one of the drive lugs.

34. As an article of manufacture, a drill stem engaging spring collet of tapered form and comprising complemental longitudinally separated spring sections each provided with a pair of radially projecting drive lugs at the larger end of the same.

35. As an article of manufacture, a drill stem engaging spring collet of tapered form and comprising complemental longitudinally separated spring sections each provided with a pair of radially projecting drive lugs at the larger end of the same, said collet sections being of reduced diameter beneath said drive lugs and split longitudinally from the smaller end of the sections to said reduced portion.

36. In well drilling apparatus, a rotary support, an adapter bushing secured on said support and provided with an angular seat, an adapter entered in said bushing and having an angular head non-rotatably engaged in said seat, a drill stem engaging collet seated in said adapter and a collet securing clamp engaged over said collet.

37. In well drilling apparatus, the combination with a rotary support having a passage therethrough and an angular seat surrounding said passage, of a drive bushing having a tapered portion and an angular head engaged in said seat, said drive bushing also having an angular seat, an adapter bushing having a tapered portion entered in the tapered portion of the drive bushing and an angular head engaged in the angular seat of the drive bushing, a tapered drill stem engaging collet entered in the tapered portion of the adapter bushing and clamp means for so securing the collet.

38. In well drilling apparatus, the combination with a rotary support having a passage therethrough and an angular seat surrounding said passage, of a drive bushing having a tapered portion and an angular head engaged in said seat, said drive bushing also having an angular seat, an adapter bushing having a tapered portion entered in the tapered portion of the drive bushing and an angular head engaged in the angular seat of the drive bushing, a tapered drill stem engaging collet entered in the tapered portion of the adapter bushing and clamp means for so securing the collet, said collet being of split spring construction and the clamp means being adjustable to vary the compressive effort of the spring collet upon the drill stem.

39. As an article of manufacture, a split spring drill stem engaging collet having tapered jaw sections and walls of reduced thickness at the ends of such tapered jaw sections with the splits extending lengthwise of the jaws into such reduced portions to increase the resilient action of the jaws and enlarged openings in the reduced wall portion at the ends of the splits and extending to near the end of the collet to provide grips for handling the collet.

40. In combination with a rotary table having a substantially cylindrical bore, a tapered conical socket for a well drill stem collet seated in said bore having an angular drive head at the upper end of the same supported on top of said table, said socket having an annular outstanding rim at the lower end of the same for engagement with the wall of the bore in the table.

41. In well drilling apparatus, the combination with a rotary table and a vertically movable chuck sleeve keyed to said table, of a spring collet adjustably seated in said chuck sleeve and having spring drill stem gripping jaws.

42. In well drilling apparatus, the combination of a rotary table, a sectional drill stem driving collet seated in said table and provided with drive lugs slidingly engaging the table, clamp means overstanding the sections of the collet and adjustable to force said sections downwardly in the rotary table and collet lifting springs mounted in the table beneath the drive lugs for lifting the collet sections as the overstanding clamp means is released.

43. In well drilling apparatus, a tapered drill pipe driving grip having an annular bearing ridge at the larger or base end of the same and adjusting means engaged with said bearing ridge.

44. In well drilling apparatus, a drill pipe driving grip in complemental longitudinally separated sections provided with complemental sections of a bearing ridge at one end and adjusting means for said grip engaged with the sections of said bearing ridge.

45. In well drilling apparatus, a drill pipe driving grip in complemental sections provided with complemental sections of a bearing ridge at one end thereof, a socket receiving said grip, a clamp bearing on said ridge and means for applying pressure to said clamp to force the grip to a variable extent down into the socket.

46. In well drilling apparatus, a drill pipe driving grip in relatively separable sections, said sections having flattened portions adjoining the edges which separate the same and a socket receiving the sections of said grip.

47. In well drilling apparatus, a conical socket and a drill pipe driving grip seated in said socket, said grip having a portion of swelled diameter intermediate the ends of the same and a clamp overstanding the socket and bearing on the end of the grip to force the same to a variable extent down into the socket.

48. In well drilling apparatus, a straight tapered conical socket, a sectional drill pipe driving grip seated in said socket and having portions intermediate the ends of the same of greater diameter than a straight taper from end to end of the grip and an adjustable clamp bearing on the grip sections to force the same down into the socket.

In witness whereof, I have hereunto set my hand this 8th day of May, 1924.

WALDO SHELDON.